United States Patent
Xie et al.

(10) Patent No.: US 10,664,711 B2
(45) Date of Patent: May 26, 2020

(54) VEHICLE PROMPT APPARATUS AND OPERATING METHOD THEREOF

(71) Applicant: Beijing Xiaomi Mobile Software Co., Ltd., Haidian District, Beijing (CN)

(72) Inventors: Yan Xie, Beijing (CN); Yueyue Chu, Beijing (CN); Yue Cheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 203 days.

(21) Appl. No.: 15/729,923

(22) Filed: Oct. 11, 2017

(65) Prior Publication Data

US 2018/0101740 A1 Apr. 12, 2018

(30) Foreign Application Priority Data

Oct. 11, 2016 (CN) .......................... 2016 1 0887379

(51) Int. Cl.
*G06K 9/00* (2006.01)
*G06K 9/46* (2006.01)
*B60W 50/14* (2020.01)

(52) U.S. Cl.
CPC ......... *G06K 9/00825* (2013.01); *B60W 50/14* (2013.01); *G06K 9/00798* (2013.01);
(Continued)

(58) Field of Classification Search
None
See application file for complete search history.

(56) References Cited

U.S. PATENT DOCUMENTS

| 7,839,272 B2 * | 11/2010 | Saito | B60R 1/00 340/425.5 |
| 2007/0263901 A1 | 11/2007 | Wu et al. | |

(Continued)

FOREIGN PATENT DOCUMENTS

| CN | 103029621 A | 4/2013 |
| EP | 1513103 A2 | 3/2005 |

(Continued)

OTHER PUBLICATIONS

Extended European Search Report issued in corresponding European Application No. 17196002.4, dated Feb. 14, 2018, 10 pages.
(Continued)

*Primary Examiner* — Sean M Conner
(74) *Attorney, Agent, or Firm* — Arch & Lake LLP

(57) ABSTRACT

A vehicle prompt apparatus and a corresponding method are provided. The method includes: acquiring an image recorded in real time by a designated terminal during driving; analyzing brightness distribution of the image and obtaining an analysis result; and when the analysis result is a first analysis result, communicating a warning message in accordance with a first prompting procedure, where the first analysis result indicates a vehicle light in the image. When other vehicles are present around the driving vehicle where the vehicle prompt apparatus is located, the acquired image may catch other vehicles' lights. By analyzing the brightness distribution in the image, when the analysis result indicates the presence of the vehicle lights, the driver can be prompted with the coming vehicle to improve the driving safety.

18 Claims, 5 Drawing Sheets

(52) U.S. Cl.
CPC ....... *G06K 9/00805* (2013.01); *G06K 9/4638* (2013.01); *G06K 9/4652* (2013.01); *B60W 2050/143* (2013.01); *B60W 2050/146* (2013.01); *G06T 2207/30261* (2013.01)

(56) References Cited

U.S. PATENT DOCUMENTS

| | | |
|---|---|---|
| 2009/0021581 A1 | 1/2009 | Sun et al. |
| 2010/0102990 A1 | 4/2010 | Kamioka |
| 2011/0228089 A1 | 9/2011 | Almeida |
| 2012/0287276 A1* | 11/2012 | Dwivedi ............ G06K 9/00825 348/148 |
| 2013/0083971 A1 | 4/2013 | Du et al. |
| 2014/0226349 A1 | 8/2014 | Morishita et al. |

FOREIGN PATENT DOCUMENTS

| | | |
|---|---|---|
| EP | 1837803 A2 | 9/2007 |
| TW | 200742688 A | 11/2007 |
| WO | 2010060413 A1 | 6/2010 |

OTHER PUBLICATIONS

First Office Action and search report issued in corresponding Chinese Application No. 201610887379.1, dated Nov. 27, 2018, 8 pages.

* cited by examiner

US 10,664,711 B2

VEHICLE PROMPT APPARATUS AND OPERATING METHOD THEREOF

CROSS-REFERENCE TO RELATED APPLICATION

This application is based on and claims priority of Chinese Patent Application No. 201610887379.1, filed on Oct. 11, 2016, which is incorporated herein by reference in its entirety.

FIELD

The present disclosure relates to vehicle safety technology, and more particularly to a vehicle prompt apparatus and method thereof.

BACKGROUND

With the rising of living standards, vehicles have popularized to millions of households. However, while the vehicles bring convenience to life, they bring some safety problems, such as frequent traffic accidents. Therefore, the vehicles' safety problems have caused a lot of attentions.

There may be a number of causes of traffic accidents. For example, when driving at night, not only the driver is tired or unfocused, but also the night vision is not clear. Thus, even the vehicles coming from opposite direction turn on their high beams, the driver may not notice the coming vehicles, resulting in traffic accidents.

SUMMARY

In order to solve the problems in the prior art, the present disclosure provides a vehicle prompt apparatus and operating method thereof.

According to a first aspect of the present disclosure, a method is provided for prompting a message to a driver in a vehicle. The method may include: acquiring an image recorded in real time by a designated terminal attached to the vehicle while the vehicle is driving; analyzing brightness distribution of the image and obtaining an analysis result, and when the analysis result is a first analysis result, causing a warning message to be communicated to the driver in accordance with a first prompting procedure, the first analysis result indicates at least one vehicle light from at least one other vehicle in the image.

According to a second aspect of the present embodiment, a vehicle prompt apparatus is provided. The vehicle prompt apparatus may include: a processor; a communication interface; a memory storage and a bus, which conducts communication among the processor, the communication interface, and the memory storage. The memory storage stores instructions. The processor executes the instructions stored in the memory storage and configured to: acquire an image of a current record of a designated terminal during driving; analyze brightness distribution of the image and obtaining an analysis result; and cause a warning message to be communicated to the driver in accordance with a first prompting procedure when the analysis result is a first analysis result. The first analysis result indicates the presence of vehicle light in the image.

In a third aspect of the present disclosure, a non-transitory tangible computer readable storage medium is provided. The non-transitory tangible computer readable storage medium may include: at least an instruction, at least a program, at least a code set or instruction set, stored in the non-transitory tangible computer readable storage medium, and loaded and executed on a processor for implementation of: during driving, acquiring an image of current record of a designated terminal during driving; analyzing brightness distribution of the image and obtaining an analysis result; and when the analysis result is a first analysis result, prompting in accordance with a first prompting procedure, the first analysis result indicates a vehicle light in the image.

Understandably, the foregoing general description and the following detailed description are only exemplary and explanatory, and do not limit the scope of the present disclosure.

BRIEF DESCRIPTION OF THE DRAWINGS

The drawings herein are incorporated in and constitute a part of this specification, showing the embodiments of the present disclosure and, together with the specification, utilized to explain the principles of the present disclosure.

DETAILED DESCRIPTION

Figure 1A:
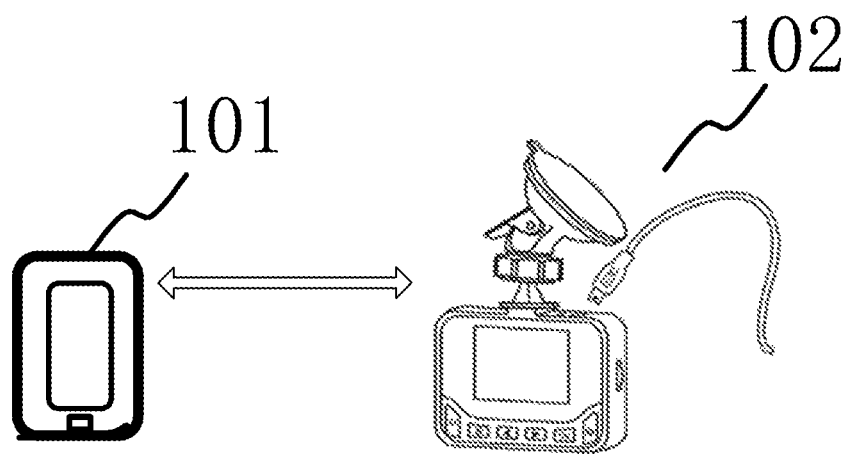
FIG. 1A is a diagram illustrating implementation of a method in accordance with an aspect of the present disclosure.

The present disclosure will be described in further detail with reference to the enclosed drawings, to clearly present the objects, technique solutions, and advantages of the present disclosure.

Hereinafter, exemplary embodiments will be described in detail, the embodiments are shown in the drawings. In the following description when referring to the drawings, the same numerals in the different drawings denote the same or similar elements, unless otherwise indicated. The embodiments described in the following exemplary embodiments are not representative of all embodiments consistent with the present disclosure. Rather, they are merely examples of devices and methods consistent with some aspects of the present disclosure as detailed in the claims.

FIG. 1A is a diagram illustrating implementation of a vehicle prompting method shown in accordance with an aspect of the present disclosure. As shown in FIG. 1A, the implementation comprising:

A vehicle prompting device 101, and a designated terminal 102. The vehicle prompting device 101 is used for prompting other vehicle lights appearing around the vehicle during driving, thereby achieving the purpose of prompting the other vehicles around the vehicle to driver, wherein the vehicle prompting device 101 can be a mobile terminal; the designated terminal 102 can be used to record current images during driving, and supply the current images to the vehicle prompting device 101, so that the vehicle prompting device 101 can analyze the brightness distribution in the images and prompt according to the analysis result, the designated terminal 102 can be a dashboard camera.

In the actual application scenario, the vehicle prompting device 101 may be integrated with the designated terminal 102, in order to make the vehicle prompting process easy to implement, and improve vehicle real time prompt according to the vehicle prompt demand. The designated terminal 102 is attached to the vehicle. The designated terminal 102 may be integrated with the vehicle as well. Thus, the acquiring image, analyzing image, and prompting the vehicle can be performed on a single device. Alternatively, in order to make the vehicle prompting process more flexible, the vehicle prompting device 101 and the designated terminal 102 may be packaged individually and set a binding relationship therebetween, the images may be acquired by the designated terminal 102, and may be analyzed by the vehicle prompting device 101. The user can set the position of the designated terminal 102 and the vehicle prompt device 101.

Figure 1B:
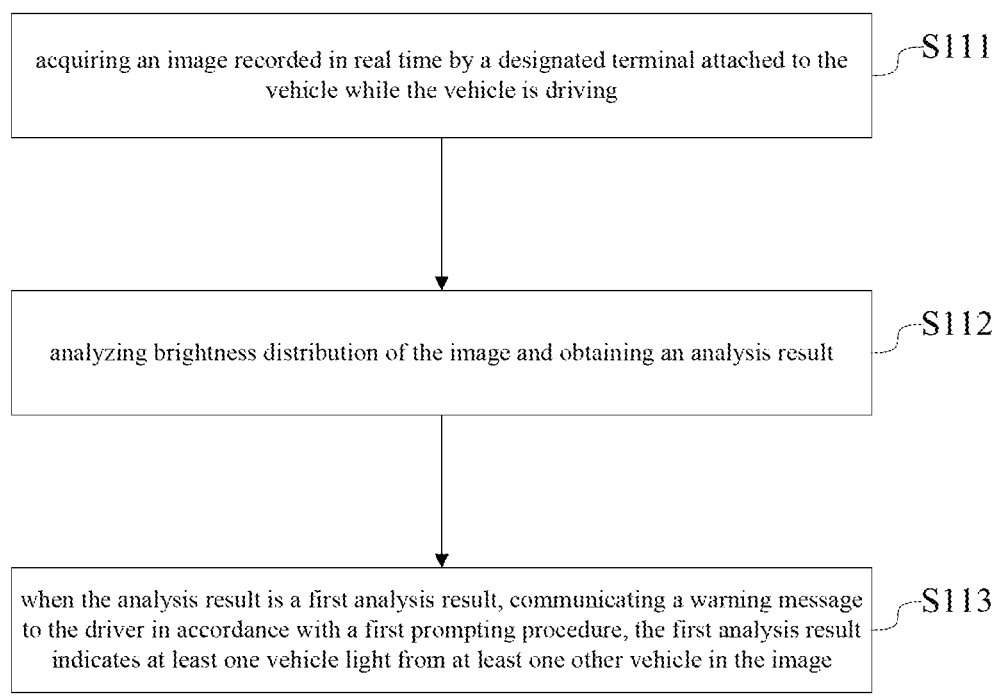
FIG. 1B is a flow chart of a method shown in accordance with an aspect of the present disclosure.

FIG. 1B is a flow chart of a vehicle prompting method shown in accordance with an aspect of the present disclosure, as shown in FIG. 1, the method comprising:

At step S111, the apparatus acquires image of current record of a designated terminal during driving. For example, the apparatus may acquire an image recorded in real time by a designated terminal attached to the vehicle while the vehicle is driving. The image of current record may include one or more images recorded in real time by the designated terminal.

At step S112, the apparatus analyzes brightness distribution of the image, and obtains analysis result.

At step S113, when the analysis result is a first analysis result, the apparatus communicate a message to be communicated the driver in accordance with a first prompting procedure, the first analysis result is used for indicating a vehicle light in the image. For example, the apparatus may cause a warning message to be communicated to the driver when the first analysis result indicates at least one vehicle light from at least one other vehicle in the image. The apparatus may communicate the warning message to the driver by transmitting, presenting, displaying, or showing relevant information in the warning message to warn the driver about a potential risk based on the analysis result.

In the relevant technology, driving at night is not safe for drivers. Therefore, there is a need for a vehicle prompting method to prompt the driver the presence of an upcoming vehicle, thereby to avoid traffic accidents and improve driving safety.

In the embodiments of the present disclosure, image is acquired by a vehicle prompt apparatus during driving. When other vehicles are present around the driving vehicle where the vehicle prompt apparatus is located, the acquired image may catch other vehicles' lights. At night or when the view is not clear, the lights and their background can have a larger brightness contrast displayed on the image. Therefore, the vehicle prompt apparatus can analyze the brightness distribution in the image. When the analysis result indicates the presence of the vehicle lights, the driver can be prompted with the upcoming vehicle to improve the driving safety.

In one possible implementation, analyzing the brightness distribution of the image and obtaining an analysis result may include: determining a first ratio, the first ratio is a proportion of pixels within a range of first brightness level to pixels of the image; and determining a second ratio, the second ratio is a proportion of pixels within a range of second brightness level to pixels of the image. When the first ratio is greater than a first value, and the second ratio is greater than a second value, the apparatus may determine whether the number of consecutive pixels in the pixels within the range of first brightness level is greater than a third value. When the number of consecutive pixels in the pixels within the range of first brightness level is greater than a third value, the apparatus obtains a first analysis result, where the range of first brightness level is greater than the range of second brightness level. The first brightness level may be adjusted according to a local time, a local weather, or other local information where the vehicle is driving.

In one possible implementation, analyzing the brightness distribution of the image and obtaining an analysis result may include: determining a first ratio, wherein the first ratio is a proportion of pixels within a range of first brightness level to pixels in the image; determining a second ratio, wherein the second ratio is a proportion of pixels within a range of second brightness level to pixels in the image; when the first ratio is greater than a first value, and the second ratio is greater than a second value, determining whether the number of consecutive pixels in the pixels within the range of first brightness level is greater than a third value; when the number of consecutive pixels in the pixels within the range of first brightness level is greater than the third value, acquiring continuously at least one additional image recorded by the designated terminal. For each of the at least one additional image, when the first ratio corresponding to each of the at least one additional image is larger than the first value, the second ratio corresponding to each of the at least one additional image is larger than the second value, and the number of consecutive pixels in the pixels within the range of first brightness level of each image is greater than the third value, obtaining the first analysis result. The range of first brightness level is greater than the range of second brightness level.

In one possible implementation, when the analysis result is a first analysis result, after prompting with the first prompting procedure, the apparatus performs acts including acquiring continuously at least one additional image recorded by the designated terminal; analyzing the brightness distribution of the at least one additional image, respectively, and obtaining at least one analysis result, and when the at least one analysis result is the first analysis result, and the number of the consecutive pixels in the pixels within the range of first brightness level is incremented in chronological order for the at least one additional image, prompting with a second prompting procedure, wherein the second prompting procedure includes a stronger warning than the first prompting procedure.

In one possible implementation, when the analysis result is a first analysis result, after prompting with the first prompting procedure, the apparatus performs acts including: acquiring continuously at least one additional image recorded by the designated terminal, analyzing the brightness distribution of the at least one additional image, respectively, and obtaining at least one analysis result, and when the at least one analysis result is the first analysis result, and number of the consecutive pixels in the pixels within the range of first brightness level is same in chronological order for the at least one additional image, prompting with a third prompting procedure, wherein the third prompting procedure prompting road safety.

In one possible implementation, when the analysis result is a first analysis result, after prompting with the first prompting procedure, the apparatus performs acts including: acquiring continuously at least one additional image recorded by the designated terminal, analyzing the brightness distribution of the at least one additional image, respectively, and obtaining at least one analysis result, and when the at least one analysis result is the first analysis result, and number of the consecutive pixels in the pixels within the range of first brightness level is decremented in chronological order for the at least one additional image, prompting with a fourth prompting procedure, wherein the fourth prompting procedure is not stronger than the first prompting procedure. In other words, the fourth prompting procedure includes an equal or less stronger warning that the first prompting procedure.

In one possible implementation, the analyzing the brightness distribution of the image and obtaining the analysis result includes: determining a first ratio, the first ratio is a proportion of pixels within a range of first brightness level to pixels of the image; determining a second ratio, the second ratio is a proportion of pixels within a range of second brightness level to pixels of the image; when the first ratio is greater than a first value, and the second ratio is greater than a second value, determining whether a number of consecutive pixels in the pixels within the range of first brightness level is greater than a third value; for a plurality of the consecutive pixels in the pixels within the range of first brightness level, when the number of consecutive pixels of each group is greater than a third value, obtaining a third analysis result, wherein the third analysis result indicates a plurality of vehicle light in the image.

The method further comprising: when the analysis result is the third analysis result, prompting with a fifth prompting procedure, wherein the fifth prompting procedure includes a stronger warning than the first prompting procedure; and In one possible embodiment, the range of first brightness level is greater than the range of second brightness level. The apparatus performs acts including: determining a first ratio, the first ratio is a proportion of pixels within a range of first brightness level to pixels of the image; determining a second ratio, the second ratio is a proportion of pixels within a range of second brightness level to pixels of the image; when the first ratio is not greater than the first value, or the second ratio is not greater than the second value, obtaining a second analysis result; or, when the number of consecutive pixels in the pixels within the range of first brightness level is not greater than the third value, obtaining a second analysis result.

In one embodiment of the present disclosure, the first prompting procedure is broadcasting a siren; or, the first prompting procedure is broadcasting a voice prompt, the voice prompt indicates the presence of the vehicle light; or, the first prompting procedure is marking an area of the vehicle light on the image, or, the first prompting procedure is popping up a prompt window on the image for prompting the presence of the vehicle light.

All of the selectable technique solutions described above, may be selected in any combination to form alternative embodiments of the present disclosure, and will not be described again herein.

Figure 2:
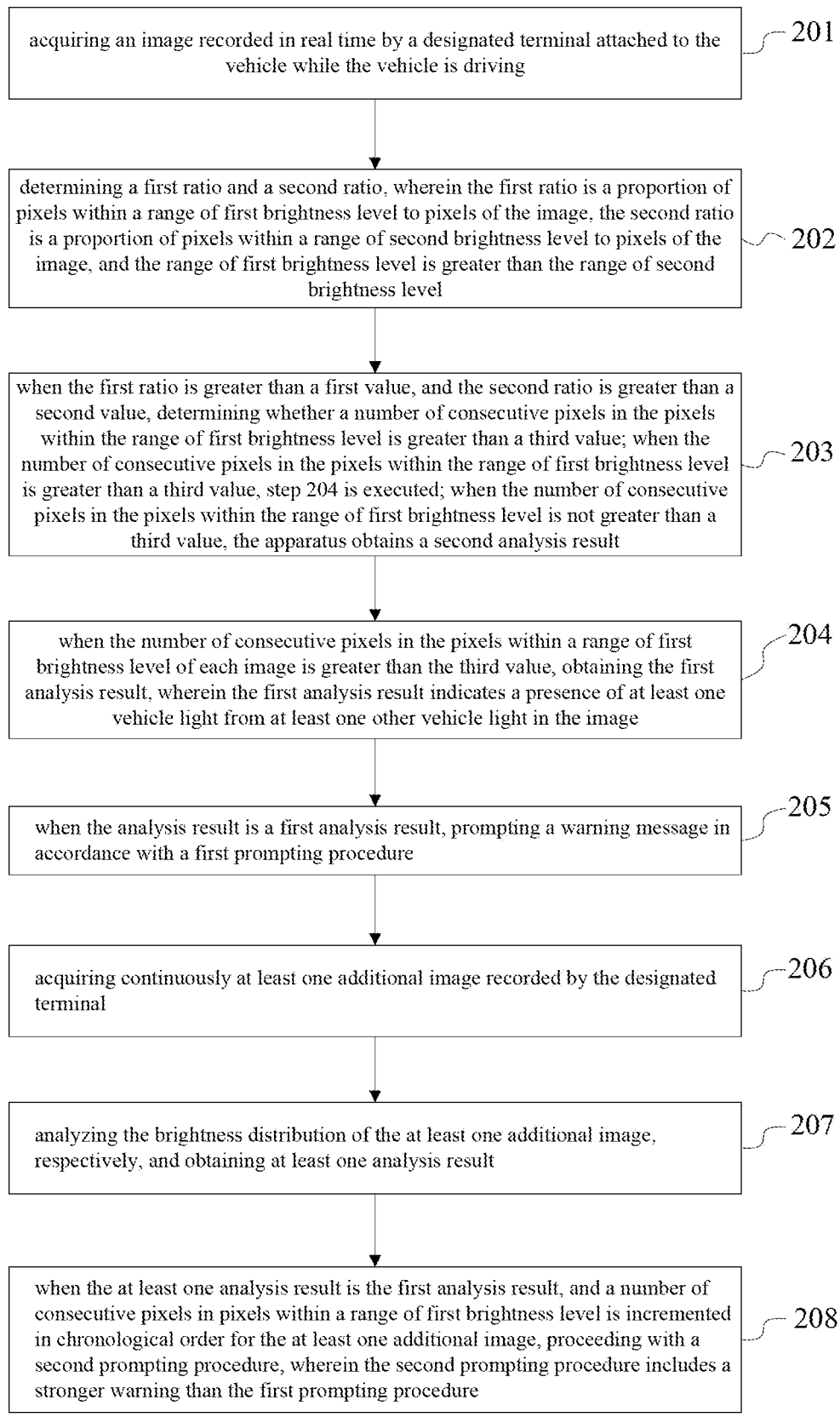
FIG. 2 is a flow chart of a method shown in accordance with another embodiment of the present disclosure.

FIG. 2 is a flow chart of a vehicle prompting method shown in accordance with an aspect of the present disclosure, as shown in FIG. 2, for application in a vehicle prompt apparatus, the method comprises the following steps.

At step 201, acquiring an image of current record of a designated terminal during driving.

The designated terminal may refer to a device attached to the vehicle and is used to record images in real time while the vehicle is driving. The present disclosure is not limited thereto. For example, the designated terminal may refer to any terminal having a camera, such as a dashboard camera or a mobile phone.

The image of current record is a real-time picture currently shot by the designated terminal during driving. The embodiment of the present disclosure does not limit directions of the images recorded by the designated terminal in the vehicle. For example, the direction may be one of the fronts of the vehicle, the rear of the vehicle, or any side of the vehicle, depending on the orientation of the lens of the designated terminal. Since the vehicle may be present in all directions of the vehicle where the designated terminal is located, the vehicle light may appear in all directions of the vehicle where the terminal is located. Therefore, the designated terminal can be placed according to the actual needs of the user.

In the presently disclosed embodiment, the methods of triggering the vehicle prompting procedure are not limited. For example, when the designated terminal is integrated with the vehicle prompting device, in order to improve overall safety of the vehicle during driving, the vehicle prompt apparatus can always acquire and analyze the image of the current record of the designated terminal in real time, when the prompt device turns on. For another example, in order to make the vehicle prompt apparatus more user-friendly and save power, the vehicle prompt apparatus can have prompting options, the vehicle prompting process can be triggered when one or more the prompting options is triggered. When the vehicle prompting device and designated terminal are individually packaged, the vehicle prompting option may be set on the designated terminal, and when the vehicle prompting option is triggered, the designated terminal may start recording the image and transmit the vehicle prompt instructions to the vehicle prompting device based on the binding relationship, the vehicle prompting device can start to acquire and analyze the images; or the vehicle prompting option may be set on the vehicle prompting device, and when the vehicle prompting option is triggered, the vehicle prompting device may start transmit the vehicle prompt instructions to the designated terminal based on the binding relationship, the recorded images can be provided to the vehicle prompting device can start vehicle prompting process.

At the step 201, the designated terminal may record the current image through the camera, and acquire the image by the vehicle prompt apparatus to perform the subsequent analysis process.

At step 202, the apparatus may determine a first ratio and a second ratio, wherein the first ratio is a proportion of pixels within a range of first brightness level to pixels in the image, the second ratio is a proportion of pixels within a range of second brightness level to pixels in the image, the range of first brightness level is greater than the range of second brightness level.

In accordance with the step 201, at step 202, the vehicle prompt apparatus can analyze the acquired image.

The inventors realize that the vehicle may turn on the light at night or when the view is not clear due to weather. When other vehicles are present around the driving vehicle where the vehicle prompt apparatus is located, the acquired image of the driving vehicle may catch other vehicles' lights. At night or when the view is not clear, the lights and their background can have a larger brightness contrast displayed on the image. Therefore, the vehicle prompt apparatus can analyze the brightness distribution in the image.

In general, the higher the value of the brightness (greyscale) of a pixel, the brighter the pixel can be; the lower the value of the brightness of a pixel, the darker the pixel can be. Thus, the range of first brightness level can indicate the range of brighter pixels; the range of second brightness level can indicate the range of darker pixels. In reality, the value of the range of first brightness level should be greater than the value of the range of second brightness level, noticeably, the range of first brightness level is larger than the range of second brightness level means that the minimum value of the first brightness range is larger than the maximum of the second brightness range. The numerical interval of the range of first brightness level can be the numerical interval of the pixel brightness in the image at night or unclear view, in accordance with numerical interval of the pixel brightness in the image at night or unclear view. And the numerical interval of the range of second brightness may be a numerical interval of the pixel brightness of the vehicle in the image. The numerical intervals of the range of first brightness level and the second brightness level are not further limited by the present disclosure. For example, in order to distinguish ranges of the brightness and darkness for more accurate analysis results, the value of the range of first brightness level can be [200,255], and the value of the second brightness level can be [0,50].

At the step 202, in order to determine whether brighter pixels and darker pixels are presented in the acquired image, and to evaluate whether brighter vehicle lights and darker background are present in the image, therefore, the number of pixels in the range of first brightness level and the number of pixels in the range of second brightness level can be calculated, and the calculation result can be divided by a total number of pixels in the image, respectively, and obtaining the first ratio and second ratio.

At step 203, when the first ratio is greater than a first value, and the second ratio is greater than a second value, the apparatus may determine whether the number of consecutive pixels in the pixels within the range of first brightness level is greater than a third value. When the number of consecutive pixels in the pixels within the range of first brightness level is greater than a third value, step 204 is executed. When the number of consecutive pixels in the pixels within the range of first brightness level is not greater than a third value, the apparatus obtains a second analysis result.

In one or more embodiments, whether the vehicle light presented in the image can be analyzed by analyzing the image recorded in real time during driving. According to the image, when the vehicle light is in the image, multiple pixels with higher brightness can be in the image.

Based on the above analysis, the first value can be used to determine whether a plurality of pixels in the range of first brightness level of the image, such that, whether the first ratio is greater than the first value. Of course, the first value should not be zero, the first value can be set according to the requirements of the identification light source, the larger the first value, the more pixels having higher brightness in the image, the higher requirements of the light source are identified. The present disclosure is not further limited thereto. For example, the first value can be twenty percent.

In reality, during night or unclear vision, lower brightness pixels should be presented in the acquired image. Conversely, at day time, no lower brightness pixels should be in the image. The second value can be used to determine whether the pixels with lower brightness presented in the image, that is, whether the second ratio can reach the second value. The second value can be set according to the requirements of identifying night or unclear vision, the larger the second value, the more pixels required having lower brightness in the image, and the higher requirements for recognizing at night or unclear vision. The present embodiment does not limit the second value. In general, the nighttime image can have more than one pixel with lower brightness, the second value should not be zero, and, when the obstruction in the daytime obstructs light, the number of the higher brightness pixels can be much larger than the number of lower brightness pixels, and the situation does not require vehicle prompting. So, in order to avoid false alarm in this case, and in order to make the analysis result more accurate, the second value can be set according to standard of eliminating the obstructions.

At the step 203, when the first ratio and second ratio can be greater the first value and the second value, respectively, the brighter pixels and darker pixels are present in the image, brighter pixels can satisfy the requirement of identifying light source, and the darker pixels can satisfy the requirement of identifying night or unclear view. Therefore, the image to be analyzed can be an image at night or with unclear view, and light source can be found in the image. When the light source is a vehicle light, the brighter pixels in the image can be concentrated in an area, wherein the concentrated area can be characterized as vehicle light.

Based on the above analysis, the third value can be used to determine whether the above-mentioned concentrated area exists in the image. The third value may be set to requirements identifying the vehicle lights according to the light sources. The larger the third value, the larger the concentrated area of the desired bright pixels is, and the higher requirements for identifying the light source as the vehicle lights. Taking into account that the shorter the actual distance between the vehicle having the vehicle prompt apparatus and the vehicle turning on the vehicle light, the larger the area of the vehicle light in the real-time image can be, and the more the number of brighter pixels in the image can be. Therefore, the third value can be set based on the vehicle prompting distance according to the actual requirements. When the prompting distance of the vehicle in real need is far away, the third value can be set relatively large; when the prompting distance of the vehicle in real need is close by, the third value can be set relatively small. According to the real need, prompting under a specific circumstance, the third value is not limited by the embodiments of the current disclosure. For example, the total number of pixels in the image is 10000, when the prompting distance of the vehicle in real need is 50 meters, the third value can be set to 2000; when the prompting distance of the vehicle in real need is 100 meters, the third value can be set to 1000. Of course, the present embodiment does not limit setting of the third value. For example, the third value may be set in advance in the vehicle prompt apparatus, or, the user may set the third value at an interface provided by the vehicle prompt apparatus.

In the embodiments of the present disclosure, when there is a concentrated area, such that a certain number of consecutive pixels can be found in the pixels within the range of first brightness level, that is, the pixels with higher brightness can be continuously distributed in an area of the image. In the evaluation, the vehicle prompt apparatus can determine the positions of the pixels in the range of first brightness level in the image, based on the pixel positions of the pixel information acquired at the step 201 by the vehicle prompt apparatus, and further determine whether pixels having consecutive positions are in the pixels within the range of first brightness level, wherein the consecutive positions refer to two pixels adjacent to each other. When the pixels having consecutive positions can be found, the number of the pixels having consecutive positions can be further determined whether satisfies the third value.

Noticeably, when the first ratio is not greater than the first value, or the second ratio is not greater than the second value, the second analysis result can be obtained indicating the pixel information in the image is insufficient to characterize the presence of the vehicle light in the image. The second analysis results can indicate no vehicle prompt required from the vehicle prompt apparatus.

In addition, when the number of consecutive pixels in the pixels within the range of first brightness level is not greater than the third value, the second analysis result can also be obtained indicating the pixel information in the image is insufficient to characterize the presence of the vehicle light in the image. The vehicle prompt may not be required from the vehicle prompt apparatus.

At step 204, when the number of consecutive pixels in the pixels within the range of first brightness level is greater than the third value, the first analysis result can be obtained indicating the vehicle light present in the image.

Based on the step 203, when the number of consecutive pixels in the pixels within the range of first brightness level is greater than the third value, the first analysis result can be obtained indicating the pixel information in the image is sufficient to characterize the presence of the vehicle light in the image.

During real driving, one or more vehicles may be shown in the driver's view, the images captured by the designated terminal may have at least one vehicle light, such that at least one concentrated area of high brightness may exist in the image, a group of higher brightness consecutive pixels may constitute the concentrated area. Thus, for at least one group of consecutive pixels in the pixels within the range of first brightness level, when the number of consecutive pixels is greater than the third value, the first analysis result can be obtained; or, when multiple vehicles around the driving vehicle (such that a number of vehicle lights appear in the image), more sever alerts can be prompted for traffic safety. Therefore, for multiple groups of consecutive pixels in the pixels within the range of first brightness level, when the number of consecutive pixels in each group is greater than the third value, the third analysis result can be obtained.

At step 205, when the analysis result is the first analysis result, prompting with the first prompting procedure. Here, the prompting procedure may cause the apparatus to present, display, transmit, provide, or otherwise cause a message to be communicated to the driver.

The first prompting procedure can refer to the way that the drivers are prompted to appear of other vehicles. The embodiment of the present disclosure does not limit the first prompting procedure. For example, the following four first prompting modes can be provided.

1. the first prompting procedure can be broadcasting siren. For example, the vehicle prompt apparatus can broadcast a beeping siren through a speaker.

2. the first prompting procedure can be broadcasting voice prompts, wherein the voice prompts can prompt the presence of the vehicle lights. For example, the vehicle prompt apparatus can broadcast the voice prompts through the speaker, wherein the voice prompts can be "detected the vehicle lights, please drive safely".

3. the first prompting procedure can refer to marking an area of the vehicle light on the image. For example, the vehicle prompt apparatus can mark the concentrated area of the pixels with higher brightness of the image in red on the image.

4. the first prompting procedure can refer to popping up a prompt window on the image for prompting the presence of the vehicle light. For example, the prompt window can display a red exclamation mark and a prompt text, such that, the prompt text can be "Detected the vehicle lights, please drive safely".

Noticeably, in order to improve the success rate, the above-mentioned various first prompting procedures can also be carried out simultaneously, and may not be limited by the present embodiment. For example, when the options of 1 and 3 of the first prompting procedure are simultaneously performed, the vehicle prompt apparatus can mark the area where the vehicle light is present in the image, while broadcasting the siren.

Actually, when the analysis result is the third analysis result, fifth prompting procedure can be used to prompt, the fifth prompting procedure includes a stronger warning than the first prompting procedure. The fifth prompting procedure is not limited to: broadcasting siren, wherein the volume of the fifth prompting procedure is higher than the first prompting procedure; alternatively, playing the voice message, wherein the volume the voice message of the fifth prompting procedure is louder than the first prompting procedure; or, the area of the vehicle lights in the image can be marked on the screen, wherein the width of the fifth prompting procedure marks is wider than the first prompting procedure marks; or a prompting window can be popped up on the screen, wherein the size of the prompting window of the fifth prompting procedure is larger than the first prompting procedure.

In order to avoid the interference of the temporary lighting during driving for more accurate analysis result, after the step 203, further analysis of current plurality of images can be performed by the following steps 2031 to 2032 to acquire the analysis results.

Step 2031, when the number of consecutive pixels in the pixels within the range of first brightness level is greater than the third value, continuously acquiring at least one additional image of the current record. The current record may include real-time images recorded in real time by the designated terminal.

At the step 2031, the method to obtain each image of the at least one additional image is the same as described in the above step 201. At least one additional image of the current record can refer to at least one additional image acquired after determination of an image that the number of consecutive pixels in the pixels within the range of first brightness level is greater than the third value. Of course, the present embodiment does not limit the number of at least one additional image, such that, the number of the at least one additional image can be five.

At step 2032, for each additional image of the at least one additional image, when the first ratio corresponding to each image is greater than a first value, and the second ratio corresponding to each image is greater than a second value, and the number of consecutive pixels in the pixels of each image within the range of first brightness level is greater than a third value, the first analysis result can be obtained.

The analysis process may be performed synchronously or in series, and is not limited by the embodiments of the present disclosure. After obtaining the first analysis result, the first prompting procedure can be used for prompting.

When the analysis result of each image is the same as that of the image in the step 203, a concentrated area of the pixels having higher brightness in the at least one of the analyzed images, such that, for a period of time, the lights indicated by the concentrated area can be in the vicinity of the vehicle equipped with the prompting device. Therefore, it is can be determined that other vehicles may be in the vicinity of the vehicle equipped with the prompting device, the first analysis result can be obtained.

In addition, when the analysis result of each image is not the same as that of the image in the step 203, in the initial image analyzed in the embodiment, the concentrated area of the pixel having a higher brightness and darkness in the first analysis of the present embodiment has been disappearing according to time. In order to avoid interference of the temporary lights, the second analysis results can be obtained, no need to prompt the driver.

At the steps 201 to step 205, the vehicle prompt apparatus may complete an initial prompting process. In fact, in order to further improve the driving safety, the image of the current record may be further analyzed based on the initial prompting, when necessary. For example, the vehicle lights are approaching, a second prompt process can be carried out.

At the step 206, continuously acquiring the at least one additional image of the current record.

At the step 206, the at least one additional image of the current record can be acquired immediately after the first prompting process by the vehicle prompt apparatus. Here, the manner of acquiring each of the at least one additional image can be the same as that of the step 201 above.

At step 207, the brightness distribution of the at least one additional image can be analyzed, respectively, to obtain the at least one analysis result.

Wherein the manner of analyzing the brightness distribution of each of the at least one additional image can be the same as described at the step 202 to step 204 above.

At step 208, when the at least one analysis result is the first analysis result, and the number of the consecutive pixels in the pixels within the range of first brightness level is incremented in chronological order for the at least one additional image, prompting with a second prompting procedure, wherein the second prompting procedure includes a stronger warning than the first prompting procedure.

The second prompting procedure can be used to prompt the driver that other vehicles may be present within a very close distance. The embodiment of the present disclosure does not limit the second prompting procedure. For example, the second prompting procedure may be similar to the first prompting procedure, but may have stronger intensity and thus present stronger warning to the driver. Specific examples may be as follows:

1. the second prompting procedure can be broadcasting siren. For example, the vehicle prompt apparatus can broadcast a beeping siren through a speaker. However, the volume of the siren of the second prompting procedure can be higher than that in the first prompting procedure.

2. the second prompting procedure can be broadcasting voice prompts, wherein the voice prompts can prompt the presence of the vehicle lights. For example, the vehicle prompt apparatus can broadcast the voice prompts through the speaker, wherein the voice prompts can be "detected the vehicle lights, please drive safely". However, the volume of the siren of the second prompting procedure can be higher than that in the first prompting procedure.

3. the second prompting procedure can refer to marking an area of the vehicle light on the image. For example, the vehicle prompt apparatus can mark the concentrated area of the pixels with higher brightness of the image in red on the image. However, the mark of the second prompting procedure can be wider than that in the first prompting procedure.

4. the second prompting procedure can refer to popping up a prompt window on the image for prompting the presence of the vehicle light. For example, the prompt window can display a red exclamation mark and a prompt text, such that, the prompt text can be "Detected the vehicle lights, please drive safely". However, the prompt window of the second prompting procedure can be larger than that in the first prompting procedure.

Noticeably, in order to improve the success rate, the above-mentioned various second prompting procedures can also be carried out simultaneously, and may not be limited by the present embodiment. For example, when the options of 1 and 3 of the second prompting procedure are simultaneously performed, the vehicle prompt apparatus can mark the area where the vehicle light is present in the image, while broadcasting the siren.

At step 208, when the at least one analysis result is the first analysis result, the concentrated area of pixels having higher brightness can be present in the analyzed at least one additional image, such that, the vehicle light characterized by the concentrated area may present near the vehicle have the vehicle prompt apparatus for a certain period of time. Further, when the number of the consecutive pixels in the pixels within the range of first brightness level is incremented in chronological order, and the area of the vehicle light occupying the initial analyzed image of the present embodiment is increasing, the vehicle where the vehicle light therefrom is approaching to the vehicle equipped with the vehicle prompt apparatus. At this moment, a stronger prompt can be necessary.

In the real application, when the vehicle where the lights are turned on does not move, such that stops at roadside, the size of the concentrated area of the pixels having higher brightness in the image may remain unchanged. For the vehicle having the prompting device, the traffic is safe in such a scenario. Thus, when the at least one analysis result is the first analysis result, and the number of consecutive pixels in the pixel within the first brightness level is at least one screen, the number of consecutive pixels remains the same in chronological order, the third prompting procedure can be used to prompt the road safety.

Here, the specific mode of the third prompting procedure may be direct or indirect. The direct mode can prompt with playing voice safety message: "current traffic is safe"; or popping out the prompting window on the screen. Indirect mode can cancel the first prompting procedure, such as cancel broadcasting siren.

In addition, there is a possibility that the vehicle surrounding the prompted vehicle may be moving away therefrom, and in this case, the safety factor of the prompted vehicle can be also increased, and the need for the prompting the vehicle is lowered. Therefore, in order to intelligently indicate this situation, when the at least one analysis result is the first analysis result, and the number of consecutive pixels in the pixels within the range of first brightness level is decremented in chronological order for at least one additional image, the fourth prompting procedure can be used for prompting, wherein the fourth prompting procedure may not be stronger than the first prompting procedure.

Here, the fourth prompting procedure is not limited to: the broadcasting siren, but the volume of the siren of the fourth prompting procedure is lower than the volume of the siren of the first prompting procedure; or playing the voice message, but the volume of the voice message of the fourth prompting procedure is lower than that of the first prompting procedure; or, marking the vehicle lights area of the image on the screen, wherein the width of the mark of the fourth prompting procedure is narrower than the width of the mark of the first prompting procedure; or popping out the prompt window on the screen, but the size of the prompt window of the fourth prompting procedure is smaller than the size of the prompt window of the first prompting procedure.

In the relevant techniques, it is unsafe for drivers to drive at night. Therefore, there is a need for a vehicle prompting method to alert upcoming vehicles to the drivers, thereby prevent traffic accidents and improve driving safety.

In the present embodiment, the images of driving vehicle can be acquired by the vehicle prompt apparatus. When other vehicles are present around the vehicle equipped with the vehicle prompt apparatus, lights of the other vehicles may be caught in the acquired images. The lights and background thereof may be displayed on the image with a larger brightness difference, at night or with unclear view. By analyzing the brightness distribution of the image, when the analysis result indicates the presence of the vehicle lights, the drivers can be prompted to improve the driving safety.

Figure 3:
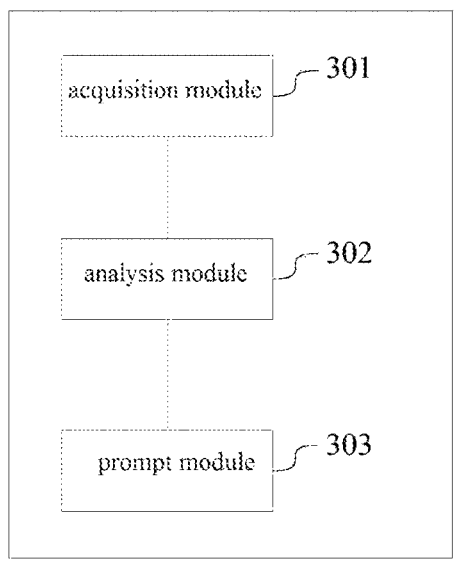
FIG. 3 is a block diagram of a vehicle prompt apparatus according to an aspect of the present disclosure.

FIG. 3 is a block diagram of a vehicle prompt apparatus according to an aspect of the present disclosure. As shown in FIG. 3, the vehicle prompt apparatus can comprise an acquisition module 301, analysis module 302, and prompt module 303.

The acquisition module 301 can be configured to acquire an image of a current record of a designated terminal during driving;

The analysis module 302 can be configured to analyze brightness distribution of the image and obtain an analysis result;

The prompt module 303 can be configured to prompt in accordance with a first prompting procedure when the analysis result is a first analysis result, wherein the first analysis result indicates the presence of vehicle lights in the image.

In the relevant techniques, it is unsafe for drivers to drive at night. Therefore, there is a need for a vehicle prompting method to alert upcoming vehicles to the drivers, thereby prevent traffic accidents and improve driving safety.

In the present embodiment, the images of driving vehicle can be acquired by the vehicle prompt apparatus. When other vehicles are present around the vehicle equipped with the vehicle prompt apparatus, lights of the other vehicles may be caught in the acquired images. The lights and background thereof may be displayed on the image with a larger brightness difference, at night or with unclear view. By analyzing the brightness distribution of the image, when the analysis result indicates the presence of the vehicle lights, the drivers can be prompted to improve the driving safety.

In one possible implementation, the analysis module 302 is configured to: determine a first ratio, wherein the first ratio is a proportion of pixels within a range of first brightness level to pixels in the image:

determine a second ratio, wherein the second ratio is a proportion of pixels within a range of second brightness level to pixels in the image;

when the first ratio is greater than a first value, and the second ratio is greater than a second value, determining whether the number of consecutive pixels in the pixels within the range of first brightness level is greater than a third value;

when the number of consecutive pixels in the pixels within the range of first brightness level is greater than the third value, obtaining a first analysis result:

wherein the range of first brightness level is greater than the range of second brightness level.

In one or more embodiments, the analysis module 302 can be further configured to: determine a first ratio, the first ratio is a proportion of pixels within a range of first brightness level to pixels of the image:

determine a second ratio, the second ratio is a proportion of pixels within a range of second brightness level to pixels of the image;

when the first ratio is greater than a first value, and the second ratio is greater than a second value, determining whether the number of consecutive pixels in the pixels within the range of first brightness level is greater than a third value;

when the number of consecutive pixels in the pixels within the range of first brightness level is greater than a third value, acquiring continuously at least one additional image of the current record;

for each of the at least one additional image, when the first ratio corresponding to each of the at least one additional image is larger than the first value, the second ratio corresponding to each of the at least one additional image is larger than the second value, and the number of consecutive pixels in the pixels within the range of first brightness level of each image is greater than the third value, obtaining the first analysis result; and wherein the range of first brightness level is greater than the range of second brightness level.

In one possible embodiment, the acquisition module 301 can be configured to acquire continuously at least one additional image of the current record;

The analysis module 302 can be configured to analyze the brightness distribution of the at least one additional image, obtain the at least one analysis result;

The prompt module 303 can be further configured to: when the at least one analysis result is the first analysis result, and the number of the consecutive pixels in the pixels within the range of first brightness level is incremented in chronological order for the at least one additional image, prompting with a second prompting procedure, wherein the second prompting procedure includes a stronger warning than the first prompting procedure.

In one possible embodiment, the acquisition module 301 can be configured to acquire continuously at least one additional image of the current record;

The analysis module 302 can be configured to analyze the brightness distribution of the at least one additional image, obtain the at least one analysis result.

The prompt module 303 can be further configured to: when the at least one analysis result is the first analysis result, and the number of the consecutive pixels in the pixels within the range of first brightness level is same in chronological order for the at least one additional image, prompting with a third prompting procedure, wherein the third prompting procedure prompting road safety.

In one possible embodiment, the acquisition module 301 can be configured to acquire continuously at least one additional image of the current record;

The analysis module 302 can be configured to analyze the brightness distribution of the at least one additional image, obtain the at least one analysis result;

The prompt module 303 can be further configured to: when the at least one analysis result is the first analysis result, and number of the consecutive pixels in the pixels within the range of first brightness level is decremented in chronological order for the at least one additional image, prompting with a fourth prompting procedure, wherein the fourth prompting procedure includes an equal or less stronger warning than the first prompting procedure.

In one possible embodiment, the analysis module 302 can be further configured to: determine a first ratio, the first ratio is a proportion of pixels within a range of first brightness level to pixels of the image:

determine a second ratio, the second ratio is a proportion of pixels within a range of second brightness level to pixels of the image;

when the first ratio is greater than a first value, and the second ratio is greater than a second value, determining whether a number of consecutive pixels in the pixels within the range of first brightness level is greater than a third value;

for a plurality of the consecutive pixels in the pixels within the range of first brightness level, when the number of consecutive pixels of each group is greater than a third value, obtaining a third analysis result, wherein the third analysis result indicates a plurality of vehicle light in the image;

The prompt module 303 can be further configured to: when the analysis result is the third analysis result, prompting with a fifth prompting procedure, wherein the fifth prompting procedure includes a stronger warning than the first prompting procedure;

wherein the range of first brightness level is greater than the range of second brightness level.

In a possible embodiment, the analysis module 302 can be further configured to: determine a first ratio, the first ratio is a proportion of pixels within a range of first brightness level to pixels of the image;

determine a second ratio, the second ratio is a proportion of pixels within a range of second brightness level to pixels of the image;

when the first ratio is not greater than the first value, or the second ratio is not greater than the second value, or, when the number of consecutive pixels in the pixels within the range of first brightness level is not greater than the third value, obtaining a second analysis result; and wherein the range of first brightness level is greater than the range of second brightness level.

In one embodiment of the present disclosure, the first prompting procedure is broadcasting a siren; or, the first prompting procedure is broadcasting a voice prompt, the voice prompt indicates presence of the vehicle light; or, the first prompting procedure is marking an area of the vehicle light on the image; or the first prompting procedure is popping up a prompt window on the image for prompting the presence of the vehicle light.

All of the alternative technique solutions can be selected in any combination to form the embodiments of the present disclosure, and may not be described again herein.

Noticeably, the vehicle prompt apparatus provided by the above embodiment is exemplified only by the above division of each of the functional modules when the vehicle prompts. In practice, the above-described functions may be assigned and completed by different functional modules in accordance with requirements, such that the internal structure of the prompt device can be divided into different functional modules to complete all or part of the functions described above. In addition, the vehicle prompt apparatus and the vehicle prompting method provided in the above embodiment follow the same principal, and the specific implementation process thereof can be described in the method embodiment and may not be described again hereto.

Figure 4:
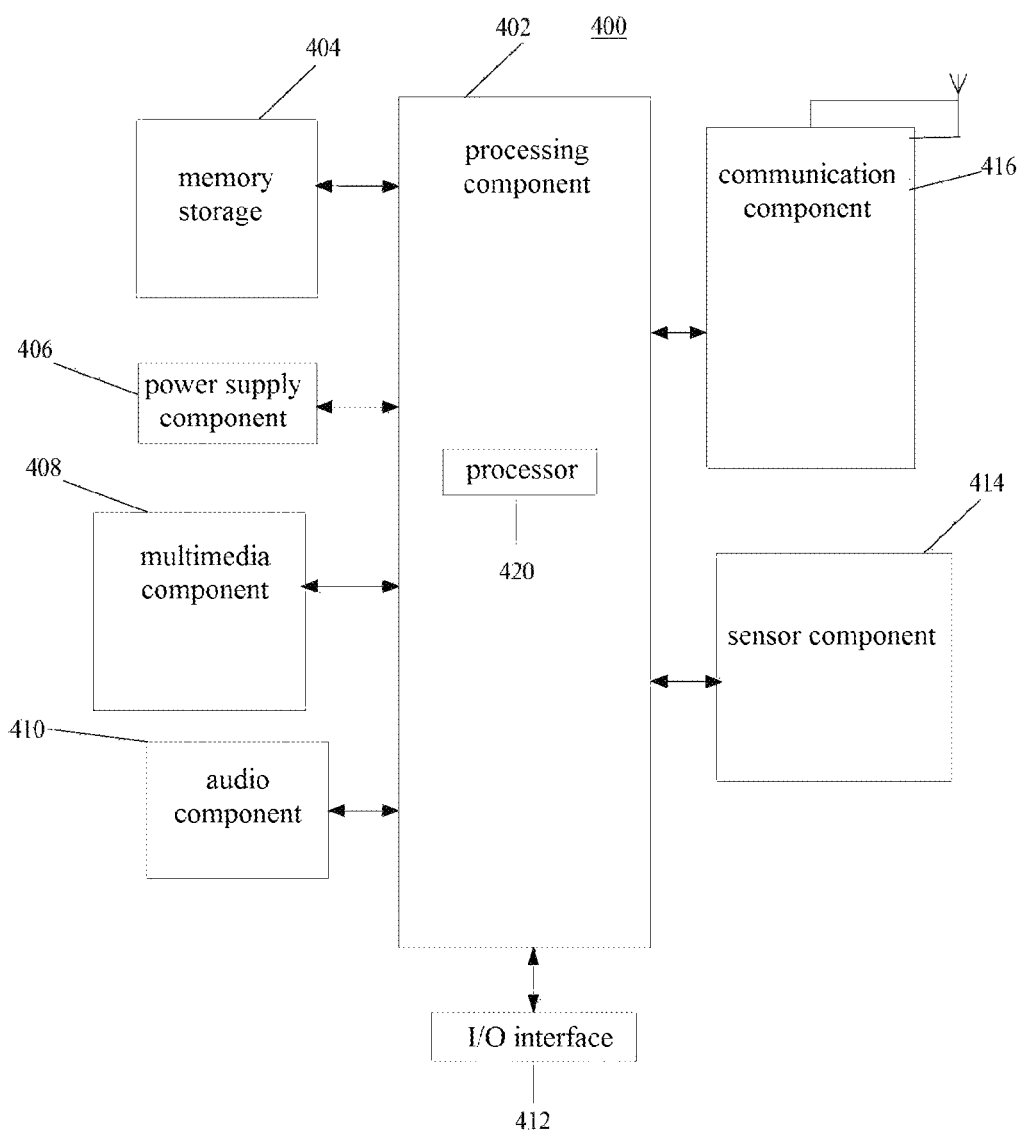
FIG. 4 is a block diagram of a vehicle prompt apparatus 400 shown in accordance with an aspect of the present disclosure.

FIG. 4 is a block diagram of a vehicle prompt apparatus 400 shown in accordance with an aspect of the present disclosure. For example, the apparatus 400 may include a mobile phone, a dashboard camera, a computer, a digital broadcasting terminal, an information receive/transmit equipment, a game console, a tablet device, a medical device, a fitness device, or a personal digital assistant, etc.

As shown in FIG. 4, the apparatus 400 may include one or more of the following components: a processing component 402, a memory storage 404, a power supply component 406, a multimedia component 408, an audio component 410, an input/output (I/O) interface 412, a sensor component 414, and a communication component 416.

The processing component 402 generally can control the overall operation of the apparatus 400, such as operations associated with display, telephone calls, data communications, camera operations, and recording operations. The processing component 402 may include one or more processors 420 to execute instructions to complete all or part of the steps described above. In addition, the processing component 402 may include one or more modules to facilitate the interaction between the processing component 402 and other components. For example, the processing component 402 may include a multimedia module to facilitate the interaction between the multimedia component 408 and the processing component 402.

The memory storage 404 can be configured to store various types of data to support the operation of the apparatus 400. Examples of the data can include instructions operating any application or method on the apparatus 400, contact data, phonebook data, messages, pictures, videos, and etc. The memory storage 404 may be implemented by any type of volatile memory devices, nonvolatile memory devices, or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 406 can provide power to the various components of the apparatus 400. The power supply component 406 may include a power management system, one or more power supplies, and other components associated with generating, managing, and distributing power for the apparatus 400.

The multimedia component 408 can include a screen that provides an output interface between the apparatus 400 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense gestures of the touch, slide, and touch panels. The touch sensor may sense not only the boundary of the touch or slide action, but also the duration and pressure associated with the touch or slide operation. In some embodiments, the multimedia component 408 can include a front camera and/or a rear camera. When the apparatus 400 is in an operating mode, such as a shooting mode or a video mode, the front camera and/or rear camera may receive external multimedia data. Each front camera and rear camera can be a fixed optical lens system or have focal length and optical zoom capability.

The audio component 410 can be configured to output and/or input audio signals. For example, the audio component 410 can include a microphone (MIC). When the apparatus 400 is in an operating mode, such as a calling mode, a recording mode, and a voice recognition mode, the MIC can be configured to receive external audio signals. The received audio signals may further be stored in the memory storage 404 or transmitted via the communication component 416. In some embodiments, the audio component 410 can also include a speaker for outputting the audio signals.

The I/O interface 412 can provide an interface between the processing component 402 and a peripheral interface module, wherein the peripheral interface module may include a keyboard, a click wheel, a button, etc. The buttons may include, but are not limited to, a home button, a volume button, a start button, and a lock button.

The sensor component 414 can include one or more sensors for providing evaluations of the various aspects of the apparatus 400. For example, the sensor component 414 may detect the on/off state of the apparatus 400, the relative positioning of the component, such that the components can be the display and keypad of the apparatus 400. The sensor component 414 may also detect changes in the positions of the apparatus 400 or any component thereof, the presence or absence of the contact between the user and the apparatus 400, the orientation or acceleration/deceleration of the apparatus 400, and temperature changes of the apparatus 400. The sensor component 414 may include proximity sensors configured to detect the presence of a nearby object without any physical contact. The sensor component 414 may also include optical sensors, such as CMOS or CCD image sensors, for use in imaging applications. In some embodiments, the sensor component 414 may also include acceleration sensors, gyro sensors, magnetic sensors, pressure sensors, or temperature sensors.

The communication component 416 can be configured to facilitate wired or wireless communication between the apparatus 400 and other devices. The apparatus 400 may access a wireless network based on a communication standard, such as WiFi, 2G, 3G, or a combination thereof. In one aspect, the communication component 416 receives a broadcast signal or broadcast related information from an external broadcast management system via a broadcast channel. In an exemplary embodiment, the communication component 416 can also include a near field communication (NFC) module to facilitate short-range communication. For example, the NFC module may be implemented based on radio frequency identification (RFID) technique, infrared data association (IrDA) technique, ultra wideband (UWB) technique, Bluetooth (BT) technique, or other techniques.

In an exemplary embodiment, the apparatus 400 may be implemented by one or more circuitry, which include application specific integrated circuits (ASICs), digital signal processors (DSPs), digital signal processing devices (DSPDs), programmable logic devices (PLDs), field programmable gate array (FPGA), controllers, microcontrollers, microprocessors, or other electronic components. The apparatus 400 may use the circuitry in combination with the other hardware or software components for performing the above described methods. Each module, sub-module, unit, or sub-unit in the disclosure may be implemented at least partially using the one or more circuitry.

In one possible implementation, the analysis results determined by analyzing the brightness distribution of the image, comprising:

determining a first ratio, the first ratio is a proportion of pixels within a range of first brightness level to pixels of the image;

determining a second ratio, the second ratio is a proportion of pixels within a range of second brightness level to pixels of the image;

when the first ratio is greater than a first value, and the second ratio is greater than a second value, determining whether the number of consecutive pixels in the pixels within the range of first brightness level is greater than a third value;

when the number of consecutive pixels in the pixels within the range of first brightness level is greater than a third value, obtaining a first analysis result;

wherein the range of first brightness level is greater than the range of second brightness level.

In one possible implement method, the analyzing the brightness distribution of the image and obtaining the analysis result includes:

determining a first ratio, the first ratio is a proportion of pixels within a range of first brightness level to pixels of the image;

determining a second ratio, the second ratio is a proportion of pixels within a range of second brightness level to pixels of the image;

when the first ratio is greater than a first value, and the second ratio is greater than a second value, determining whether a number of consecutive pixels in the pixels within the range of first brightness level is greater than a third value;

when the number of consecutive pixels in the pixels within the range of first brightness level is greater than a third value, acquiring continuously at least one additional image of the current record;

for each of the at least one additional image, when the first ratio corresponding to each of the at least one additional image is larger than the first value, the second ratio corresponding to each of the at least one additional image is larger than the second value, and the number of consecutive pixels in the pixels within the range of first brightness level of each image is greater than the third value, obtaining the first analysis result; and wherein the range of first brightness level is greater than the range of second brightness level.

In one possible implement method, when the analysis result is a first analysis result, after prompting with the first prompting procedure, further includes:

acquiring continuously at least one additional image of the current record;

analyzing the brightness distribution of the at least one additional image, respectively, and obtaining at least one analysis result, and when the at least one analysis result is the first analysis result, and the number of the consecutive pixels in the pixels within the range of first brightness level is incremented in chronological order for the at least one additional image, prompting with a second prompting procedure, wherein the second prompting procedure includes a stronger warning than the first prompting procedure.

In one possible implement method, when the analysis result is a first analysis result, after prompting with the first prompting procedure, includes:

acquiring continuously at least one additional image of the current record, analyzing the brightness distribution of the at least one additional image, respectively, and obtaining at least one analysis result, and when the at least one analysis result is the first analysis result, and number of the consecutive pixels in the pixels within the range of first brightness level is same in chronological order for the at least one additional image, prompting with a third prompting procedure, wherein the third prompting procedure prompting road safety.

In one possible implement method, when the analysis result is a first analysis result, after prompting with the first prompting procedure, includes:

acquiring continuously at least one additional image of the current record, analyzing the brightness distribution of the at least one additional image, respectively, and obtaining at least one analysis result, and when the at least one analysis result is the first analysis result, and number of the consecutive pixels in the pixels within the range of first brightness level is decremented in chronological order for the at least one additional image, prompting with a fourth prompting procedure, wherein the fourth prompting procedure is not stronger than the first prompting procedure.

In one possible implement method, the analyzing the brightness distribution of the image and obtaining the analysis result includes:

determining a first ratio, the first ratio is a proportion of pixels within a range of first brightness level to pixels of the image:

determining a second ratio, the second ratio is a proportion of pixels within a range of second brightness level to pixels of the image;

when the first ratio is greater than a first value, and the second ratio is greater than a second value, determining whether a number of consecutive pixels in the pixels within the range of first brightness level is greater than a third value;

for a plurality of the consecutive pixels in the pixels within the range of first brightness level, when the number of consecutive pixels of each group is greater than a third value, obtaining a third analysis result, wherein the third analysis result indicates a plurality of vehicle light in the image;

The method further includes: when the analysis result is the third analysis result, prompting with a fifth prompting procedure. The fifth prompting procedure includes a stronger warning than the first prompting procedure. The range of first brightness level is greater than the range of second brightness level.

In one possible implementation method, the analyzing the brightness distribution of the image and obtaining the analysis result includes: determining a first ratio, the first ratio is a proportion of pixels within a range of first brightness level to pixels of the image; determining a second ratio, the second ratio is a proportion of pixels within a range of second brightness level to pixels of the image. When the first ratio is not greater than the first value, or the second ratio is not greater than the second value, obtaining a second analysis result.

In one or more embodiments, the first prompting procedure is broadcasting a siren; or, the first prompting procedure is broadcasting a voice prompt, the voice prompt indicates the presence of the vehicle light; or, the first prompting procedure is marking an area of the vehicle light on the image; or, the first prompting procedure is popping up a prompt window on the image for prompting the presence of the vehicle light.

In an exemplary embodiment, a non-transitory tangible computer readable storage medium containing the memory storage 404 comprising at least an instruction, at least a program, at least a code set or instruction set, the at least an instruction, at least a program, at least a code set or instruction set may be executed by the processor 420 of the apparatus 400 to perform the vehicle prompting method described above. For example, the non-transitory tangible computer readable storage medium may include ROMs, random access memories (RAMs), CD-ROMs, magnetic tapes, floppy disks, and optical data storage devices.

Figure 5:
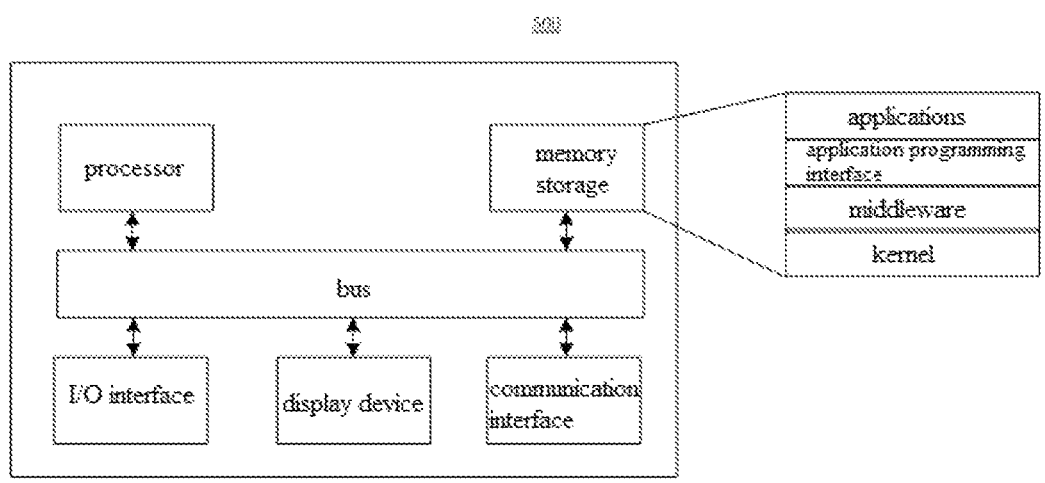
FIG. 5 is a block diagram of a vehicle prompt apparatus 500 shown in accordance with an aspect of the present disclosure.

FIG. 5 is a schematic diagram of a vehicle prompting device 500 shown in accordance with an aspect of the disclosure. As shown in FIG. 5, the vehicle prompting apparatus 50X) includes a processor, a communication interface, a memory and a bus. It may also include an input/output (L/O) interface and a display device, wherein the processor, the memory, the input/output interface the display device, and the communication interface are communicated to each other via the bus. The memory stores the computer program, the processor can execute the computer program stored on the memory, to implement the vehicle prompting method described above in the embodiments of FIGS. 1B and 2.

The bus is the circuit connecting the described elements and transferring there between. For example, the processor receives commands from other elements over the bus, decrypts the received commands, and performs calculations or data processing based on decrypted commands. The memory may include program modules such as kernel, middleware, application programming interface (API), and applications. The program module may be software, firmware, hardware, or at least two thereof. The I/O interface forwards commands or data entered by the user through input and output devices (such as sensors, keyboards, or touch screens). The display device displays various information to the user. The communication interface connects the vehicle prompt device 500 with other network devices, user equipment, and network. For example, the communication interface may be wired or wirelessly connected to the network to connect to other external network devices or user equipment. Wireless communication can include at least one of the following: Wireless Fidelity (WiFi), Bluetooth, Near Field Communication (NFC), Global Positioning System (GPS), cellular communication, and Long-Term Evolution (LTE), Long Term Evolution-Advanced (LTE-A), Code Division Multiple Access (CDMA)). Wideband CDMA (WCDMA), Universal Mobile Telecommunication System (UMTS), Wireless Broadband (WiBro), and Global System for Mobile Communications (GSM). The wired communication can include at least one of the following: Universal Serial Bus (USB), High Definition Multimedia Interface (HDMI), Asynchronous Transmission Standard Interface (Recommended Standard 232, RS-232), and Plain Old Telephone Service (POTS). The Internet may be a telecommunications network and a communication network. The communication network may be a computer network, an Internet, an Internet of things, a telephone network. The vehicle prompting device 500 may connect to the network through a communication interface. The protocol used by the vehicle prompting device 500 to communicate with other network devices can be supported by at least one of, the applications, the application programming interface (API), the middleware, the kernel, and the communication interface.

Other embodiments of the present disclosure may be possible to those skilled in the art, upon taking into consideration of the specification and practice of the invention disclosed herein. The present application is intended to cover any variations, uses, or adaptations of the present disclosure, which follow the general principles of the present disclosure and include the common general knowledge or conventional technical solution in the art without departing from the present disclosure. The specification and embodiments are exemplified, and the true scope and spirit of the present disclosure can be indicated by the following claims.

Understandably, the present disclosure is not limited to the precise constructions described above and shown in the enclosed drawings, and various modifications and changes may be made without departing from the scope thereof. The scope of the present disclosure is limited only by the appended claims.

What is claimed is:

1. A method for communicating a message to a driver in a vehicle, comprising:
   acquiring an image recorded in real time by a designated terminal attached to the vehicle while the vehicle is driving;
   analyzing brightness distribution of the image and obtaining an analysis result; and
   when the analysis result is a first analysis result, communicating a warning message to the driver in accordance with a first prompting procedure, wherein the first analysis result indicates at least one vehicle light from at least one other vehicle in the image;
   wherein the analyzing the brightness distribution of the image and obtaining the analysis result includes:
      determining a first ratio, wherein the first ratio is a proportion of a number of pixels within a range of first brightness level to a total number of pixels in the image;
      determining a second ratio, wherein the second ratio is a proportion of a number of pixels within a range of second brightness level to the total number of pixels in the image;
      when the first ratio is greater than a first value, and the second ratio is greater than a second value, determining whether a number of consecutive pixels in the pixels within the range of first brightness level is greater than a third value; and
      when the number of consecutive pixels in the pixels within the range of first brightness level is greater than the third value, obtaining the first analysis result;
      wherein values in the range of first brightness level are greater than values in the range of second brightness level, and the second value is set according to requirements of identifying night or unclear vision.

2. The method of claim 1 wherein analyzing the brightness distribution of the image and obtaining the analysis result comprises:
   when the number of consecutive pixels in the pixels within the range of first brightness level is greater than the third value, acquiring continuously at least one additional image recorded by the designated terminal; and
   for each of the at least one additional image, when the first ratio corresponding to each of the at least one additional image is larger than the first value, the second ratio corresponding to each of the at least one additional image is larger than the second value, and the number of consecutive pixels in the pixels within the range of first brightness level of each image is greater than the third value, obtaining the first analysis result.

3. The method of claim 1 further comprising:
   when the analysis result is a first analysis result, after communicating with the first prompting procedure, acquiring at least one additional image recorded by the designated terminal;
   analyzing the brightness distribution of the at least one additional image, respectively, and obtaining at least one analysis result, and
   when the at least one analysis result is the first analysis result, and the number of consecutive pixels in the pixels within the range of first brightness level is incremented in chronological order for the at least one additional image,
   communicating with a second prompting procedure, wherein the second prompting procedure includes a stronger warning than the first prompting procedure.

4. The method of claim 1 further comprising:
   when the analysis result is a first analysis result, after communicating with the first prompting procedure,
   acquiring continuously at least one additional image recorded by the designated terminal,
   analyzing the brightness distribution of the at least one additional image, respectively, and obtaining at least one analysis result, and
   when the at least one analysis result is the first analysis result, and the number of consecutive pixels in the pixels within the range of first brightness level is same in chronological order for the at least one additional image,
   communicating with a third prompting procedure, wherein the third prompting procedure prompts road safety.

5. The method of claim 1 further comprising:
   when the analysis result is a first analysis result, after communicating with the first prompting procedure,
   acquiring continuously at least one additional image recorded by the designated terminal,
   analyzing the brightness distribution of the at least one additional image,
   respectively, and obtaining at least one analysis result, and
   when the at least one analysis result is the first analysis result, and the number of consecutive pixels in the pixels within the range of first brightness level is decremented in chronological order for the at least one additional image,
   communicating with a fourth prompting procedure, wherein the fourth prompting procedure includes an equal or less stronger warning than the first prompting procedure.

6. The method of claim 1 wherein the analyzing the brightness distribution of the image and obtaining the analysis result includes:
   for a plurality of the consecutive pixels in the pixels within the range of first brightness level, when a number of consecutive pixels of each group is greater than a third value, obtaining a third analysis result, wherein the third analysis result indicates a plurality of vehicle light in the image; and
   when the analysis result is the third analysis result, communicating with a fifth prompting procedure,
   wherein the fifth prompting procedure includes a stronger warning than the first prompting procedure.

7. The method of claim 1 wherein the analyzing the brightness distribution of the image and obtaining the analysis result includes:
   when the first ratio is not greater than the first value, or the second ratio is not greater than the second value, or,
   when the number of consecutive pixels in the pixels within the range of first brightness level is not greater than the third value, obtaining a second analysis result.

8. The method of claim 1 wherein the first prompting procedure includes:
   broadcasting a siren; or broadcasting a voice prompt, wherein the voice prompt indicates presence of the vehicle light; or marking an area of the vehicle light on the image; or popping up a prompt window on the image for prompting the presence of the vehicle light.

9. An apparatus comprising:
a processor;
a communication interface;
a memory storage and a bus, wherein the bus conducts communication among the processor, the communication interface, and the memory storage;
wherein the memory storage stores instructions;
wherein the processor executes the instructions stored in the memory storage and configured to:
acquire an image recorded in real time by a designated terminal attached to a vehicle while the vehicle is driving;
analyze brightness distribution of the image and obtaining an analysis result; and
when the analysis result is a first analysis result, communicate a warning message in accordance with a first prompting procedure, wherein the first analysis result indicates a presence of at least one vehicle light from at least one other vehicle light in the image;
wherein the processor executes the instructions stored in the memory storage and is further configured to:
determine a first ratio, wherein the first ratio is a proportion of a number of pixels within a range of first brightness level to a total number of pixels in the image:
determine a second ratio, wherein the second ratio is a proportion of a number of pixels within a range of second brightness level to the total number of pixels in the image;
when the first ratio is greater than a first value, and the second ratio is greater than a second value, determining whether a number of consecutive pixels in the pixels within the range of first brightness level is greater than a third value; and
when the number of consecutive pixels in the pixels within the range of first brightness level is greater than the third value, obtain a first analysis result;
wherein values in the range of first brightness level are greater than values in the range of second brightness level, and the second value is set according to requirements of identifying night or unclear vision.

10. The apparatus of claim 9 wherein the processor executes the instructions stored in the memory storage and further configured to:
when the number of consecutive pixels in the pixels within the range of first brightness level is greater than the third value, acquire continuously at least one additional image recorded by the designated terminal; and
for each of the at least one additional image, when the first ratio corresponding to each of the at least one additional image is larger than the first value, the second ratio corresponding to each of the at least one additional image is larger than the second value, and the number of consecutive pixels in the pixels within the range of first brightness level of each image is greater than the third value, obtain at least one analysis result.

11. The apparatus of claim 9 wherein the processor executes the instructions stored in the memory storage and further configured to:
acquire continuously at least one additional image recorded by the designated terminal;
analyze the brightness distribution of the at least one additional image, respectively, and obtaining at least one analysis result; and
when the at least one analysis result is the first analysis result, and the number of consecutive pixels in pixels within a range of first brightness level is incremented in chronological order for the at least one additional image, proceed with a second prompting procedure, wherein the second prompting procedure includes a stronger warning than the first prompting procedure.

12. The apparatus of claim 9 wherein the processor executes the instructions stored in the memory storage and further configured to:
acquire continuously at least one additional image recorded by the designated terminal;
analyze the brightness distribution of the at least one additional image, respectively, and obtaining at least one analysis result; and
when the at least one analysis result is the first analysis result, and the number of consecutive pixels in the pixels within the range of first brightness level is same in chronological order for the at least one additional image, proceed with a third prompting procedure, wherein the third prompting procedure prompts road safety.

13. The apparatus of claim 9 wherein the processor executes the instructions stored in the memory storage and further configured to:
acquire continuously at least one additional image recorded by the designated terminal;
analyze the brightness distribution of the at least one additional image, respectively, and obtaining at least one analysis result; and
when the at least one analysis result is the first analysis result, and the number of consecutive pixels in the pixels within the range of first brightness level is decremented in chronological order for the at least one additional image, proceed with a fourth prompting procedure, wherein the fourth prompting procedure includes an equal or less stronger warning than the first prompting procedure.

14. The apparatus of claim 9 wherein the processor executes the instructions stored in the memory storage and further configured to:
for a plurality of the consecutive pixels in the pixels within the range of first brightness level, when a number of consecutive pixels of each group is greater than a third value, obtain a third analysis result, wherein the third analysis result indicates a plurality of vehicle light in the image; and
when the analysis result is the third analysis result, prompt with a fifth prompting procedure, wherein the fifth prompting procedure includes a stronger warning than the first prompting procedure.

15. The apparatus of claim 9 wherein the processor executes the instructions stored in the memory storage and further configured to:
when the first ratio is not greater than the first value, or the second ratio is not greater than the second value, or when the number of consecutive pixels in the pixels within the range of first brightness level is not greater than the third value, obtain a second analysis result.

16. The apparatus of claim 9 wherein the first prompting procedure includes:
broadcasting a siren; or
broadcasting a voice prompt, wherein the voice prompt indicates presence of the vehicle light; or marking an area of the vehicle light on the image; or popping up a prompt window on the image for prompting the presence of the vehicle light.

17. A non-transitory computer readable storage medium comprising instructions causing one or more processor to perform acts comprising:

acquiring an image recorded in real time by a designated terminal attached to a vehicle while the vehicle is driving;

analyzing brightness distribution of the image and obtaining an analysis result; and when the analysis result is a first analysis result, prompting a warning message in accordance with a first prompting procedure, wherein the first analysis result indicates at least one vehicle light from at least one other vehicle in the image;

wherein the analyzing the brightness distribution of the image and obtaining the analysis result includes:

determining a first ratio, wherein the first ratio is a proportion of a number of pixels within a range of first brightness level to a total number of pixels in the image;

determining a second ratio, wherein the second ratio is a proportion of a number of pixels within a range of second brightness level to the total number of pixels in the image;

when the first ratio is greater than a first value, and the second ratio is greater than a second value, determining whether a number of consecutive pixels in the pixels within the range of first brightness level is greater than a third value; and when the number of consecutive pixels in the pixels within the range of first brightness level is greater than the third value, obtaining the first analysis result;

wherein values in the range of first brightness level are greater than values in the range of second brightness level, and the second value is set according to requirements of identifying night or unclear vision.

18. The non-transitory computer readable storage medium of claim 17 wherein the first prompting procedure includes:

broadcasting a siren; or broadcasting a voice prompt, wherein the voice prompt indicates presence of the vehicle light; or marking an area of the vehicle light on the image; or popping up a prompt window on the image for prompting the presence of the vehicle light.

* * * * *